US008476834B2

(12) United States Patent
Park et al.

(10) Patent No.: US 8,476,834 B2
(45) Date of Patent: Jul. 2, 2013

(54) AUTOMATIC LIGHTING CONTROL SYSTEM

(75) Inventors: Young Suk Park, Anyang-si (KR); Won Kyung Lee, Seoul (KR)

(73) Assignee: Best Digital Co. Ltd. (KR)

( * ) Notice: Subject to any disclaimer, the term of this patent is extended or adjusted under 35 U.S.C. 154(b) by 0 days.

(21) Appl. No.: 13/121,934

(22) PCT Filed: Mar. 10, 2011

(86) PCT No.: PCT/KR2011/001663

§ 371 (c)(1), (2), (4) Date: Mar. 30, 2011

(87) PCT Pub. No.: WO2011/112013

PCT Pub. Date: Sep. 15, 2011

(65) Prior Publication Data

US 2012/0319597 A1 Dec. 20, 2012

(30) Foreign Application Priority Data

Mar. 11, 2010 (KR) ........................ 10-2010-0021870

(51) Int. Cl.

*H05B 37/02* (2006.01)
*B60Q 1/48* (2006.01)
*G08G 1/01* (2006.01)

(52) U.S. Cl.

USPC .......... 315/154; 315/155; 315/86; 250/222.1; 250/214 R; 340/932.2; 340/933

(58) Field of Classification Search

USPC ................. 340/541–542, 566, 615, 933, 944, 340/932.2; 250/221, 222.1, 214 R; 315/151, 315/153–156, 159, 86, 113

See application file for complete search history.

(56) References Cited

U.S. PATENT DOCUMENTS

| | | | | |
|---|---|---|---|---|
| 3,790,848 | A * | 2/1974 | Lai | 315/155 |
| 4,629,941 | A * | 12/1986 | Ellis et al. | 315/153 |
| 7,057,153 | B2 * | 6/2006 | Linge et al. | 250/221 |
| 7,633,406 | B2 * | 12/2009 | Miki | 340/9.1 |
| 2010/0201267 | A1 * | 8/2010 | Bourquin et al. | 315/32 |
| 2010/0265100 | A1 * | 10/2010 | Jalbout et al. | 340/932.2 |

* cited by examiner

*Primary Examiner* — Vibol Tan

(74) *Attorney, Agent, or Firm* — John K. Park; Park Law Firm

(57) ABSTRACT

The present invention relates to an automatic lighting control system, and more particularly, to an automatic lighting control system which is capable of predicting a movement route of a resident in a complex building and automatically controlling lighting located in the movement route. According to the present invention, it is possible to reduce power consumption by simplifying configuration of lamps and controlling luminance of lamps on a resident or vehicle movement route by predicting motion of the resident or the vehicle through centralized control for a plurality of lamps, and to provide increased movement convenience and emotional satisfaction of a resident by showing the resident a movement route through lamps and securing a field of view on the movement route.

16 Claims, 7 Drawing Sheets

AUTOMATIC LIGHTING CONTROL SYSTEM

CROSS-REFERENCE TO RELATED APPLICATION

This application claims the benefit of Korean Application No. 10-2010-0021870, filed on Mar. 11, 2010, with the Korean Intellectual Property Office, the disclosure of which is incorporated herein by reference.

BACKGROUND OF THE INVENTION

1. Field of the Invention

The present invention relates to an automatic lighting control system, and more particularly, to an automatic lighting control system which is capable of predicting a movement route of a resident in a complex building and automatically controlling lighting located in the movement route.

2. Description of the Related Art

In general, complex buildings (such as apartments, villas, efficiency apartments, venture towers, etc.) have lamps, such as incandescent lamps, fluorescent lamps, LED lamps and the like, installed in underground parking lots, around sidewalks leading to entrance doors of the complex buildings, or in even corridors in the complex buildings.

Among these lamps, as lamps installed in underground parking lots and around sidewalks keep their luminance constant, intelligent lamp control models have been developed to reduce power consumption of such lamps.

One of existing models is to provide a sensor and a controller for each of lamps installed in an underground parking lot wherein the sensor senses a resident who passes through a place where a corresponding lamp is installed and the controller temporarily increases luminance of the lamp.

However, the lamp having such a sensor and a controller has problems that it is considerably expensive, which may result in inefficiency in terms of cost when many lamps are installed in a wide place such as the underground parking lot, and it is operated based on the sensor, which may result in its frequent malfunction.

In addition, another conventional lamp control model for reduction of power consumption is that a controller for controlling a plurality of lamps installed in an underground parking lot detects motion through an image obtained through a camera and controls a particular lamp corresponding to a position of a person or vehicle.

These conventional models take considerable time to perform a procedure from calculation for real time motion detection through an image obtained through a camera to lamp control after motion check through the calculation, which may result in difficulty in lamp control in immediate response to motion of a person or vehicle. Accordingly, these conventional models have problems of decreased efficiency due to frequent lamp adjustment after the person or vehicle passed by and increased risk of accident due to improper response of lamps.

SUMMARY OF THE INVENTION

Accordingly, it is an object of the present invention to reduce power consumption by simplifying configuration of lamps and controlling luminance of lamps on a resident or vehicle movement route by predicting motion of the resident or the vehicle through centralized control for a plurality of lamps, and to prevent accidents in dark regions by minimizing a control delay of lamps located on a movement route due to a calculating process such as sensor or motion detection.

It is another object of the present invention to provide increased movement convenience and emotional satisfaction of a resident or a user by securing a field of view on a movement route through lighting control having a route guidance function for the resident or the user.

It is still another object of the present invention to provide easy access to an intended resident building to a visitor who visits the resident building for the first time by a central server predicting a movement route of the visitor through mutual communication between the resident and the visitor and controlling lamps located on the predicted movement route to show the visitor the movement route.

It is yet still another object of the present invention to allow a visitor or a resident to go to a residence of the resident with no trouble by providing the visitor or the resident with movement route guidance through lighting control outside and inside a complex building.

To achieve the above objects, according to an aspect of the invention, there is provided an automatic lighting control system for predicting a movement route and showing the movement route through control of lamps, including: a camera section which is disposed on the movement route to pick up an image; a lamp control section which controls luminance and/or turning-on/off of each of a plurality of lamps; a DB section which stores resident information including address information and vehicle information, and route-related information; an image recognition section which recognizes vehicle parking spot information and the vehicle information based on the image provided by the camera section and checks an actual movement route of a vehicle passenger through the image; and a controller which determines a predicted movement route between a parking spot and a residence based on the address information extracted by matching the vehicle information provided by the image recognition section with the DB section, the parking spot information, and the route-related information, generates control information for lamps located on the predicted movement route, provides the generated control information to the lamp control section, shows the predicted movement route of the passenger through lamp control by the lamp control section, and, if the actual movement route provided by the image recognition section is different from the predicted movement route, generates control information for a different movement route according to a movement direction and replaces the generated control information for the existing control information by providing the generated control information to the lamp control section.

The route-related information may include information on a position of an entrance door or a front door for entry to a residence corresponding to the address information. The camera section may include IP cameras or CCTV cameras.

The lamp control section may control luminance of lamps located on the predicted movement route and luminance of lamps not located on the predicted movement route separately based on the control information.

The controller may determine that the actual movement route is different from the predicted movement route if a difference in movement direction between the actual movement route and the predicted movement route exceeds a preset reference value or if the actual movement route is out of a range preset on the predicted movement route.

If the actual movement route stays on a specific point for a preset period of time or a displacement is not changed to exceed a preset value, the controller may generate control information for a lamp corresponding to the specific point or at least one lamp adjacent to the specific point and replace the generated lamp control information for the control information for the predicted movement route, and, if it is detected that the displacement exceeds the preset value, the controller may return the lamp control information to the existing control information.

The plurality of lamps may be placed in an underground parking lot. The route-related information may include information for a plurality of entrance doors located in the underground parking lot, and the controller may weight the control information for the predicted movement route connecting the entrance door of the residence corresponding to the address information and the parking spot and provide the weighted control information to the lamp control section preferentially, wherein, if the actual movement route is different from the predicted movement route, the controller may generate corrected control information by weighting a predicted movement route matching a movement direction of the actual movement route and control the lamp control section to replace the existing control information with the corrected control information.

The DB section may store use frequency information of the resident for each of a plurality of entrance doors installed in the underground parking lot, and the controller may provide control information for a predicted movement route between an entrance door having the highest use frequency and the parking spot to the lamp control section preferentially based on the parking spot information and the use frequency information, wherein, if the actual movement route is different from the predicted movement route, the controller may generate corrected control information for a movement route to an entrance door having the next highest use frequency based on the use frequency information and control the lamp control section to replace the existing control information with the corrected control information.

The image recognition section may transmit information indicating whether or not the resident passes through the entrance door of the underground parking lot based on an image transmitted by a camera located at the entrance door in the camera section, and the controller may control the lamp control section to restore the lamps controlled according to the control information to an original state based on the information indicating whether or not the resident passes through the entrance door.

A sidewalk may be located between the underground parking lot and the residence corresponding to the address information, the lamp control section may control streetlamps located on the sidewalk, and the controller may set the front door of the residence corresponding to the address information and the entrance door as a start point and an end point, respectively, based on the information indicating whether or not the resident passes through the entrance door, and generate control information for the streetlamps based on a movement route extracted from the DB section.

The automatic lighting control system may further include a home automation system including an interphone, and the controller may generate the control information based on address information obtained by matching address information input to the interphone with the DB section.

If the interphone is installed at a gate of the underground parking lot, the controller may generate the control information by determining a parking spot adjacent to the address information based on the address information input to the interphone and determining a predicted movement route between the determined parking spot and the interphone.

To achieve the above objects, according to another aspect of the invention, there is provided an automatic lighting control system for predicting a movement route of a user and showing the movement route through control of lamps, including: a camera section which picks up an image of the user; a reader which recognizes a tag of the user and transmits information of the recognized tag along with identification information of the reader; a lamp control section which controls luminance and/or turning-on/off of each of a plurality of lamps; a DB section which stores address information and route-related information corresponding to the tag information; an image recognition section which checks an actual movement route of the user through an image based on the image provided by the camera section; and a controller which obtains address information by matching the tag information received from the reader with the DB section, determines a predicted movement route based on a position of the reader corresponding to the identification information, the address information and the route-related information, generates control information for at least some lamps located on the predicted movement route, provides the generated control information to the lamp control section, shows the predicted movement route of the user through lamp control by the lamp control section, and, if the actual movement route provided by the image recognition section is different from the predicted movement route, generates control information for a different movement route according to a movement direction and replaces the generated control information for the existing control information by providing the generated control information to the lamp control section.

The image recognition section may generate current position information of the user at preset time intervals, and the controller may generate the control information based on the current position information generated by the image recognition section so that lamps located on the predicted movement route can be sequentially turned on depending on a position of the user, and provide the generated control information to the lamp control section.

The controller may generate control information to restore luminance of lamps located at positions through which the user passes to an original state based on the current position information of the user, and provide the generated control information to the lamp control section.

According to the invention, it is possible to reduce power consumption by simplifying configuration of lamps and controlling luminance of lamps on a resident or vehicle movement route by predicting motion of the resident or the vehicle through centralized control for a plurality of lamps, and to provide increased movement convenience and emotional satisfaction of a resident by showing the resident a movement route through lamps and securing a field of view on the movement route.

In addition, it is possible to prevent accidents in dark regions by controlling luminance of lamps located on a predicted movement route of a resident in order to minimize a control delay of the lamps due to a calculating process such as sensor or motion detection.

In addition, it is possible to provide easy access to an intended resident building to a visitor who visits the resident building for the first time, as well as weakminded persons, children and old men, by obtaining address information visited by the visitor from an interphone included in a home automation system and used for visitor check, generating a predicted movement route of the visitor and controlling luminance of lamps located on the predicted movement route to show the visitor the predicted movement route.

Furthermore, it is possible to provide increased generality for all lamps in a complex building by providing a visitor or a resident with movement route guidance through lighting control for streetlamps or indoor lamps outside and inside a complex building, thereby allowing the visitor or the resident to go to a residence of the resident with no trouble.

BRIEF DESCRIPTION OF THE DRAWINGS

The above and/or other aspects and advantages of the present invention will become apparent and more readily appreciated from the following description of the embodiments, taken in conjunction with the accompanying drawings of which.

DETAILED DESCRIPTION OF THE PREFERRED EMBODIMENT

Hereinafter, an automatic lighting control system according to a preferred embodiment of the present invention will be described in detail with reference to the accompanying drawings.

The present invention relates to control of lamps installed in an underground parking lot or a sidewalk affiliated with a complex building and/or lamps installed in corridors and stairs in the complex building, which is capable of predicting a movement route of a resident and turning on lamps corresponding to the predicted movement route, thereby providing the resident with movement convenience and emotional satisfaction and providing guide information to allow a visitor to visit a visit destination easily.

Figure 1:
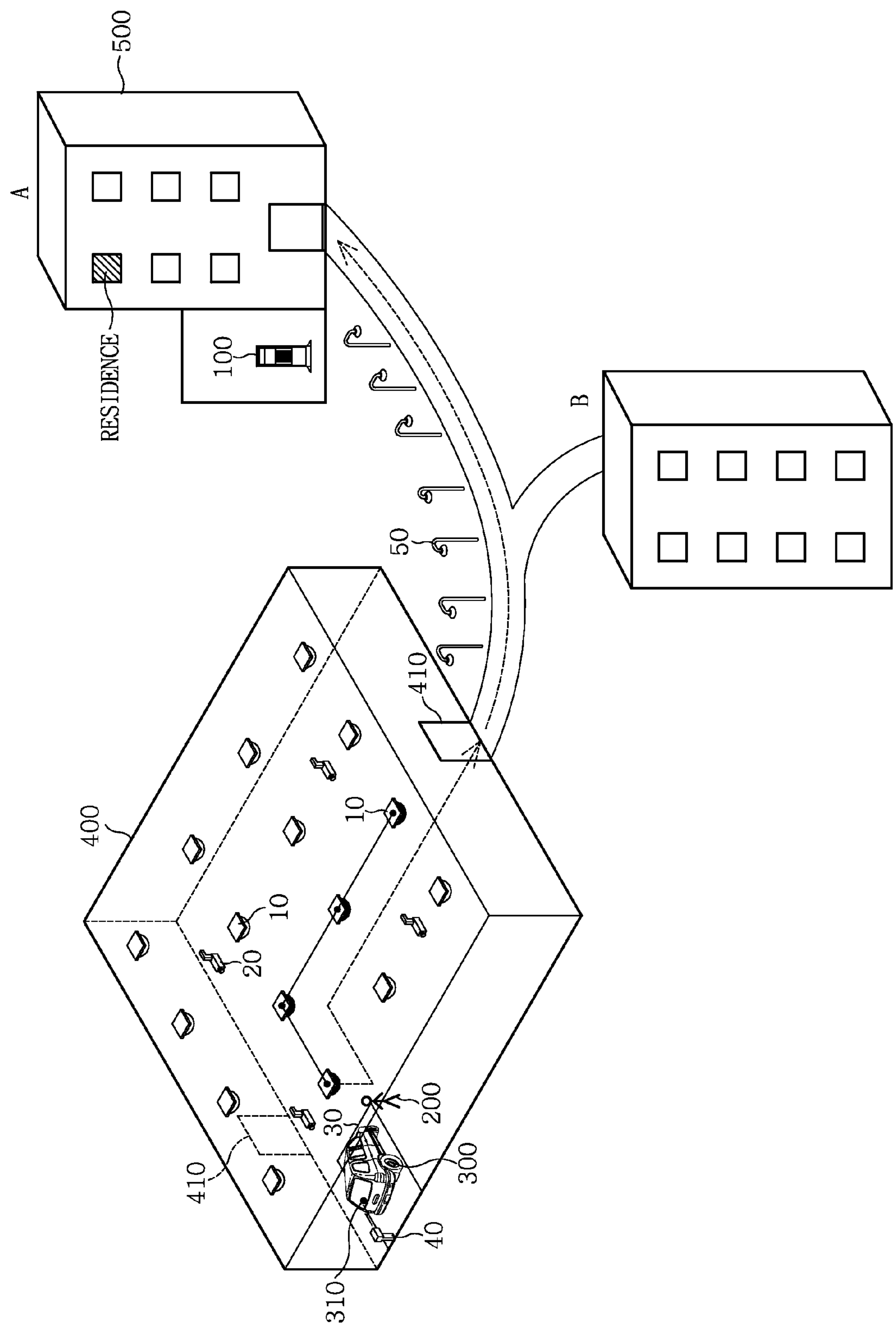
FIG. 1 is a schematic view showing a structure and operation of an automatic lighting control system according to an embodiment of the present invention.

Referring first to FIG. 1 showing a structure of an automatic lighting control system according to an embodiment of the present invention, a management server 100 located in an administration center 510 of a complex building 500 may be connected, via a network, to lamps 10, cameras 20 and street-lamps 50 installed inside and outside a underground parking lot 400 and the complex building 500. In this case, the cameras 20 may be implemented by CCTV or IP cameras and the network configuration may be configured by a wired and/or wireless network. In addition, the wired network is preferably configured with a fiber-optic cable and the wireless network is preferably configured with UWB (Ultra Wide Band), Wi-Fi (Wireless Fidelity) or WiBro (Wireless Broadband).

Typically, the management server 100 located in the administration center 510 of a complex building 500 stores address information, a resident ID, vehicle information and so on of a resident 200 in a database (DB). Thus, for example, the management server 100 may recognize an image provided by each camera 20, check a license plate number of a vehicle 300 of the resident 200, and acquire the address information corresponding to the vehicle 300 of the resident 200 by comparing the checked license plate number with the vehicle information stored in the DB.

In this case, the management server 100 may be provided with information of a tag 310 which is attached to the vehicle 300 of the resident 200 for recognition of the vehicle 300 and is read by a reader 40 located in each parking spot 30. In addition, the management server 100 may store the tag information in the DB in association with an ID of the resident 200 or the vehicle 300 and acquire vehicle information and address information matching the ID of the resident 200 or the vehicle 300.

In addition, the management server 100 can recognize images provided by the cameras 20 and detect motion of the resident 200 or the vehicle 300 through the image recognition. This motion detection may be done by employing a method using a difference in block between a previous known frame and a later frame or a method using a displacement pattern of a search region, through which a movement direction of the resident 200 or the vehicle 300 can be detected to check its actual movement path. The above methods for detection of image motion are well known in the art and, therefore, explanation thereof will be omitted for the purpose of brevity.

That is, the management server 100 located in the complex building 500 is an element which has been used widely in the art in that it basically secures information of the resident 200 such as vehicle information and personal information in the DB and constitutes a portion of a home automation system by connection with various cameras and sensing means located in the complex building 500.

However, since this information is for exclusive use for residential management and home automation and is treated as additional separate functions by construction companies, the information stored in the management server 100 has not been utilized for control of buildings.

Accordingly, the present invention aims at reduced power consumption, user's increased convenience and user's increased emotional satisfaction by providing novel lighting control through a combination of information and infrastructure associated with the management server 100 and a lighting system which is installed inside and outside a complex building and is controlled by the management server 100.

In more detail, the present invention can create a new function of a home automation system with increased movement convenience and emotional satisfaction of the resident 200 by the management server 100 which predicts a movement route based on information of a user 200 or the resident 200 obtained through cameras or sensing means, causes the lamps 10 located on the movement route to be automatically turned on so that the user 200 or the resident 200 can be guided to the movement route, and, if the movement route of the resident 200 is different from a movement route indicated by the lamps 10, recognizes that fact through the cameras 20 and causes the lamps 10 for a changed movement route to be turned on. In addition, it should be understood that this function may be equally applied to not only the residents 200 but also visitors who visit the complex building 500 for the first time and will be given the same effect as the residents 200.

Explaining this function in more detail based on the above description, when the resident 200 attempts to move to the complex building A 500, which is the residence of the resident 200, after parking his/her vehicle in the underground parking lot, the management server 100 searches information on a license number of the vehicle recognized by the camera 20 from the DB, thereby acquiring vehicle information and address information of the resident 200 matching the vehicle information.

Accordingly, the management server 100 can know an entrance door 410 of the underground parking lot to which the resident 200 intends to move by comparing the address information with the DB, and acquire a predicted movement route by calculating the predicted movement route from the parking spot 30 of the vehicle 300 parked in the underground parking lot 400 to the entrance door 410 or by matching the parking spot 30 with the entrance door 410, with the predicted movement route from each parking spot 30 to the entrance door 410 stored in the DB. Hereinafter, the management server 100 may cause the lamps 10 located on the predicted movement route to be turned on in advance.

In this case, the management server 100 may check the parking spot of the vehicle 300 through the cameras 20 or the tag 310 and the DB stores, as route-related information, position information on a passage point, such as the entrance door 410 or a front door, located on a movement route connecting the parking spot 30 and the residence (complex building A) 500 corresponding to the address information. In addition, as shown in the figure, the management server 100 may control turning-on/off or luminance of the lamps 10 so that the resident can be guided to the predicted movement route.

In addition, the management server 100 may check an actual movement route of the resident 200, including a movement direction of the resident 200, in real time or at preset time intervals, through detection of motion of images provided by the cameras 20. Further, if a predicted movement route indicated by the lamps 10 which has already been turned on is different from the actual movement route, the management server 100 may change the control over the lamps 10 so that a changed predicted movement route can be shown by turning on lamps 10 located on the changed movement route corresponding to a changed entrance door by predicting an entrance door 410 corresponding to a changed movement direction of the resident 200.

Detailed description of such a lamp control will be given based on detailed configuration of the management server 100.

In the meantime, the management server 100 may also control the streetlamps 50 on a sidewalk located between the complex building A 500, which is the residence of the resident 200, and the entrance door 410 of the underground parking lot 400 through control of turning-on/off or luminance of the streetlamps 50 in the same manner as the lamps 10.

As one example, if there are two sidewalks which lead from the entrance door 410 of the underground parking lot 400 to the complex building A 500 and another complex building B, respectively, the management server 100 may recognize the complex building A 500, which is the address information corresponding to the resident 200, from the address information stored in the DB and control streetlamps 50 located on a sidewalk leading to the complex building A 500, so that the resident 200 can be guided to his/her predicted movement route. In this event, the management server 100 may also make simultaneous control over the lamps 10 in the underground parking lot 400 and the streetlamps on the sidewalk, all of which are located on the predicted movement route.

FIGS. 2 to 5 illustrate configuration of the automatic lighting control system of the present invention, showing an embodiment of a process of controlling lamps in the underground parking lot. However, it should be understood that the following process can be applied to streetlamps installed around the complex building and/or lamps installed within the complex building, as described above, without being limited to the following description.

Figure 2:
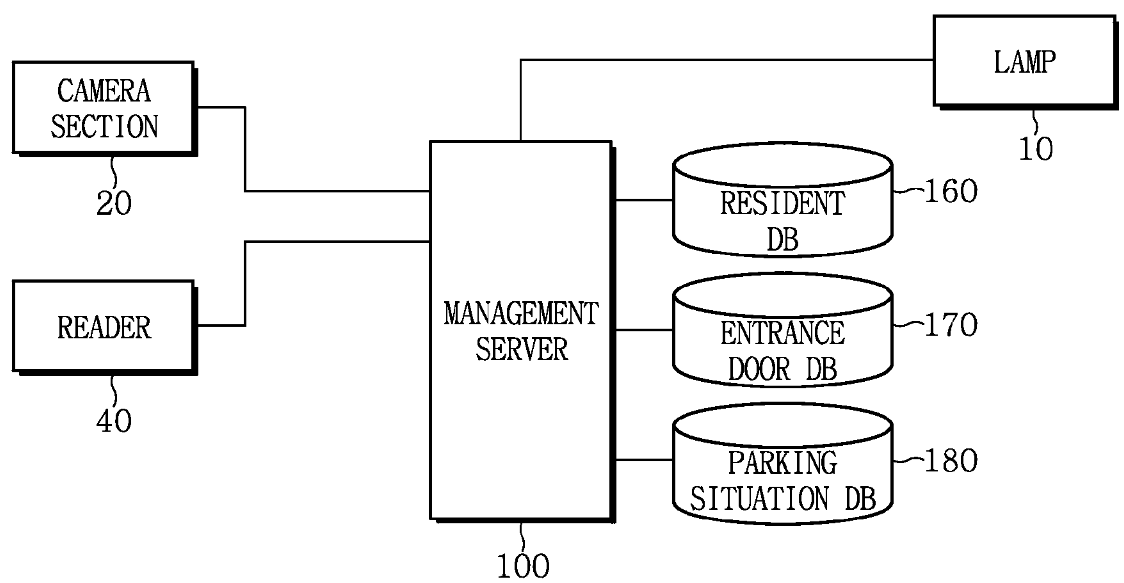
FIG. 2 is a block diagram showing a configuration of the automatic lighting control system according to an embodiment of the present invention.

Referring to FIG. 2 first, the management server 100 typically installed in an administration center of a complex building may be connected to a camera section 20 including a plurality of cameras installed inside and outside the complex building, and a reader 40 installed in a gate or each parking spot.

In addition, the management server 100 may include a resident DB 160 which stores address information and vehicle information on residents, an entrance door DB 170 which stores position information on entrance doors connected to residences corresponding to the address information via sidewalks, and a parking situation DB 180 which stores parking situation information including parking position information for each parking position of the underground parking lot and information on whether or not vehicles are parked at the parking positions.

In addition, the management server 100 may calculate a predicted movement route based on information transmitted from the camera section 20 and the reader 40 and may be connected to the lamps 10, which are located on the predicted movement route, via a line in order to control the lamps 10. In this case, the management server 100 may be connected to wireless communication units equipped within the lamps 10 and may control the lamps 10 through wideband communication with the wireless communication units.

Figure 3:
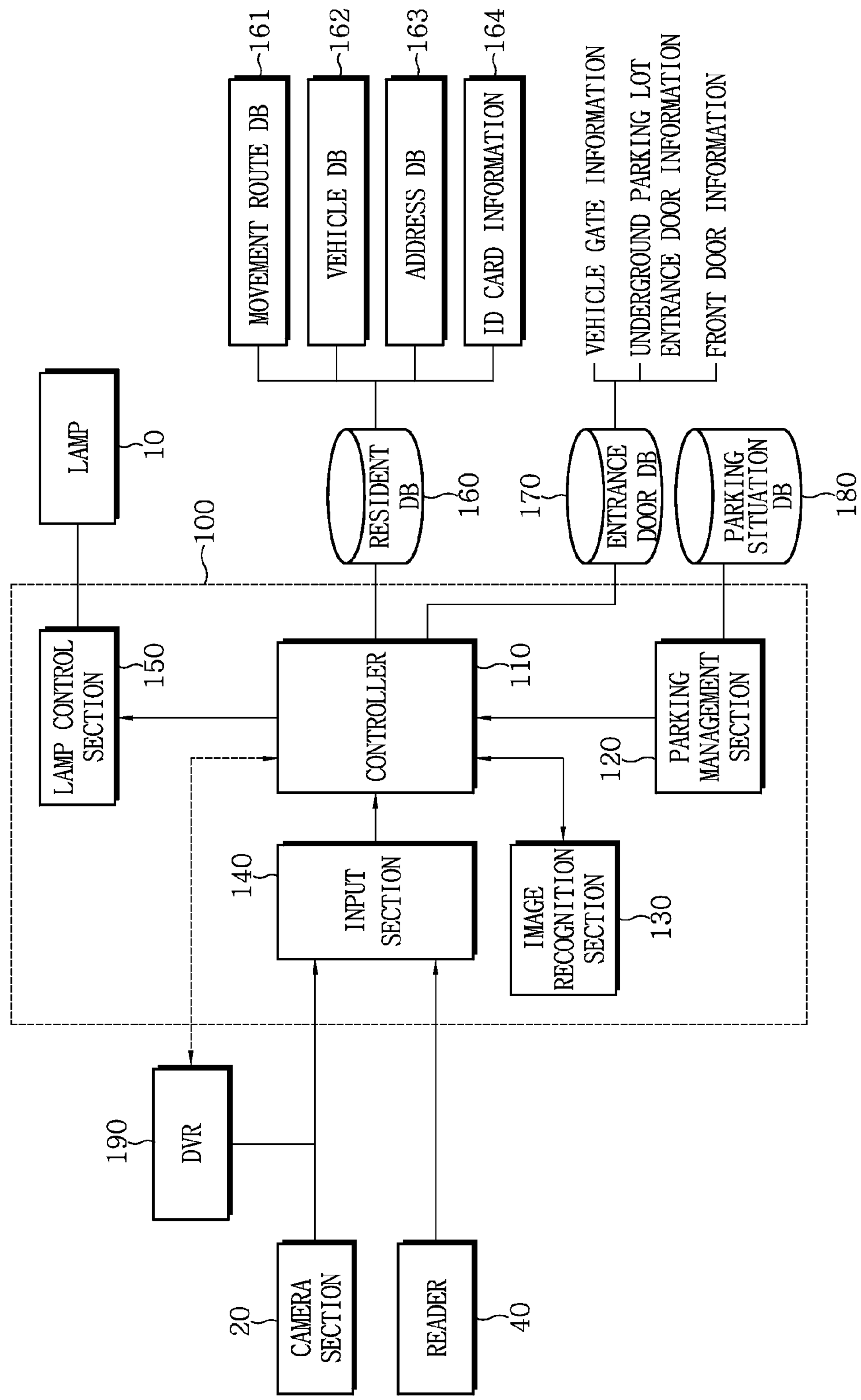
FIG. 3 is a block diagram showing a detailed configuration of a management server in the automatic lighting control system according to an embodiment of the present invention.

FIG. 3 shows a detailed configuration of the management server 100. As shown, the management server 100 may include a parking management section 120, an image recognition section 130, an input section 140, a lamp control section 150 and a controller 110. The input section 140 may be connected to the camera section 20 and the reader by wire or wireless and may receive image data and/or tag information to be provided to the controller 110.

In addition, a separate digital video recorder (DVR) 190 may be connected between the camera section 20 and the input section 140 to receive and store the image data provided by the camera section 20. In this case, the DVR 190 may compress and store or decode the image data using a preset codec which may be supported by, for example, a moving picture expert group (MPEG).

The image recognition section 130 may receive the image data from the controller 110, recognize license plate numbers of vehicles or detect motion of the vehicles from the received image data, and provide license plate number information obtained through the license plate number recognition and motion information obtained through the motion detection to the controller 110. Accordingly, the controller 110 may compare the license plate number information with the vehicle information stored in the resident DB 160 to acquire the address information corresponding to the vehicle information and determine an actual movement route for a movement direction or current position of a resident based on the motion information. In addition, the image recognition section 130 may be configured to be incorporated in the DVR 190 for interworking with the controller 110.

Furthermore, the image recognition section 190 may recognize, from the image data, a parking spot at where a vehicle is parked and may provide the parking spot information to the controller 110 which may then provide the parking spot information to the parking management section 120. In this embodiment, the parking spot information may be a number set for each parking spot.

Accordingly, the parking management section 120 may compare the parking spot information received from the controller 110 with the parking situation DB 180 and update the parking spot information to prevent different vehicles from being parked at the parking spot and may provide the updated parking spot information including extra parking spot information to the controller 110.

In addition, the controller 110 may match the vehicle parking spot information with the vehicle information based on identification information, such as MAC information or IP information, provided by the reader 40 installed for each parking spot and tag information recognized by the reader 40 from a tag attached to the vehicle or a passenger, and may provide a result of the matching of the parking spot information with the vehicle information, as the parking situation information, to the parking situation DB 180.

In this embodiment, the reader 40 may detect the vehicle tag information at preset time intervals and provide a null signal, along with the identification information, to the controller 110 if no tag information is detected. Then, the controller 110 may provide the identification information and the null signal to the parking management section 120 and control the parking management section 120 to update the parking situation information of the parking situation DB 180, indicating vacancy of the parking spot with no detection of the tag information.

Hereinafter, a process of controlling lamps when the predicted movement route is generated will be described in detail with reference to the configuration of the management server 100.

The controller 110 generates a predicted movement route based on information provided by the input section 140, the image recognition section 130 and the entrance door DB 170.

First, the controller 110 provides the image data, which are received from the camera section 20 through the input section 140, to the image recognition section 130 and compares the license plate number information obtained through the image recognition of the image recognition section 130 with the resident DB 160 to acquire the address information and the vehicle information related to the resident.

The resident DB 160 includes a vehicle DB 162 which stores vehicle information of residents, an address DB 163 which stores address information of the residents, and an ID card DB 164 which stores ID card information of the residents or vehicles. The controller 110 may acquire the vehicle information by comparing the license plate number information with the vehicle DB 162 and acquire the address information of the address DB 163 matching the vehicle information.

In addition, upon receiving the tag information from the reader 40, the controller 110 may acquire the ID information by comparing the tag information with the ID card DB 164 and acquire the address information and the vehicle information matching the ID information.

Thereafter, the controller 110 may check parking spot information based on the image recognition by the image recognition section 130 for the image data received through the input section 140 or the identification information received through the input section 140 and acquire the address information by comparing the parking spot information with the address DB 163 based on the image recognition by the image recognition section 130 and the tag information.

In this case, the controller 110 may acquire position information on an entrance door connected to a residence corresponding to the acquired address information from the entrance door DB 170 based on the address information and calculate a predicted movement route between the parking spot and the entrance door based on the entrance position information and the parking spot information.

In addition, the entrance door DB 170 may store information on the predicted movement route connecting the parking spot and the entrance door, thereby allowing the controller 110 to extract the predicted movement route based on the parking spot information and the entrance door information.

In addition, as described above, the entrance door DB 170 may store position information on a vehicle gate of the underground parking lot or a front door of the complex building, thereby allowing the controller 110 to generate a predicted movement route and corresponding control information by determining start and end points of the lamps or the streetlamps 50 to be controlled depending on a resident position detected by the image recognition section 130.

Thereafter, the controller 110 may generate control information to be used to control at least one of the lamps 10 located on the predicted movement route. The controller 110 may transmit the control information to the lamp control section 150 to control the lamps 10 and the lamp control section 150 may control the lamps 10 located on the predicted movement route based on the control information.

Figure 4:
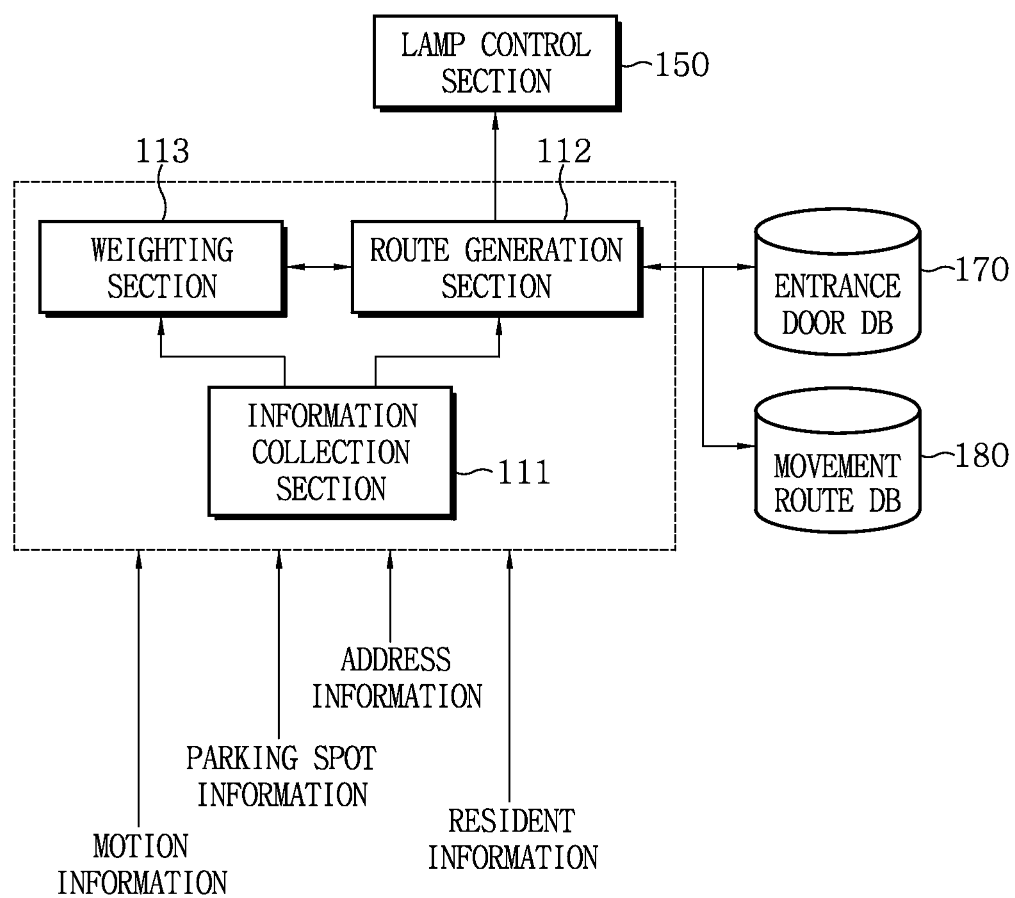
FIG. 4 is a block diagram showing a detailed configuration of a controller of the automatic lighting control system according to an embodiment of the present invention.

Hereinafter, a process of controlling the lamps through detailed configuration of the controller 110 will be described with reference to FIGS. 4 and 5.

As shown, the controller 110 may include an information collection section 111, a route generation section 112 and a weighting section 113. The information collection section 111 may acquire address information by comparing the parking spot information or the identification information acquired through the input section 140 (FIG. 3) with the resident DB 160 and acquire motion information from the image recognition section 130.

Thereafter, the information collection section 111 provides the parking spot information and the address information to the route generation section 112. The route generation section 112 may calculate a predicted movement route based on the parking spot information, the address information and the entrance door position information of the entrance door obtained from the entrance door DB 170 or extract a predicted movement route by comparing the address information with the entrance door DB 170 storing a predicted movement route corresponding to the address information.

In this case, the predicted movement route may be divided into a plurality of sectors, each of which is a space having a predetermined width, and may be represented as a set of sector addresses assigned to the sectors. Referring to FIG. 5, as shown, the underground parking lot is divided into a plurality of sectors assigned with respective sector addresses which may be set in the form of a matrix in correspondence to the lamps 10.

Accordingly, the parking spot information and the entrance door position information may be also set as the sector addresses. The route generation section 112 may generate the predicted movement route based on the parking spot information and the entrance door position information and may generate a set of sector addresses included in the predicted movement route as the control information.

Figure 5:
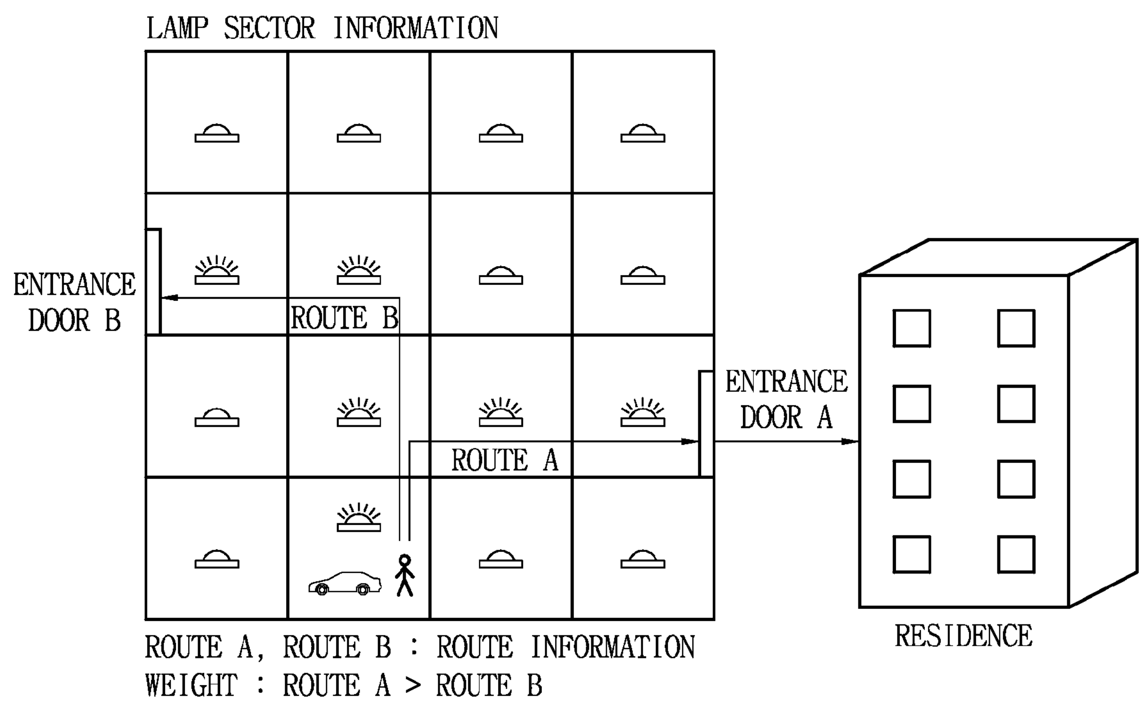
FIG. 5 is a view showing a route generating process of the automatic lighting control system according to an embodiment of the present invention.

If there are two entrance doors A and B as shown in FIG. 5, the route generation section 112 may generate control information for route A and route B from the parking spot to the entrance doors A and B simultaneously. Then, the route generation section 112 may temporarily store the control information for the generated predicted movement routes in a memory.

Then, for the control information generated by the route generation section 112, the weighting section 113 may weight the control information for route A including the entrance door position information for entrance door A connected to the residence based on the address information, as shown in FIG. 5.

Thereafter, the route generation section 112 may provide the weighted control information to the lamp control section 150 which may then control lamps 10 located at the corresponding sector addresses included in the control information.

In addition, when the route generation section 112 generates the control information, the weighting section 113 may control the image recognition section 130 to track a resident image in a video transmitted from the camera section 20 and generate resident motion information.

Then, the image recognition section 130 may transfer the generated resident motion information to the information collection section 111 and the weighting section 113 may receive the motion information from the information collection section 111 and compare the motion information with the predicted movement route control information read out of the memory.

Thereafter, if the motion information matches the predicted movement route (route A), the weighting section 113 keeps a weight currently assigned to the predicted movement route (route A) without transferring any information to the route generation section 112 and maintain the conditions of the lamps 10 located on route A under control of the lamp control section 150.

At this time, the weighting section 113 may check through the image recognition section 130 whether or not the resident stays on the predicted movement route for a period of time. For example, if a resident image is continuously detected at a certain position beyond a preset period of time or lies within a range set around the certain position, then it may be determined that the resident stays in that place.

In this case, the weighting section 113 may keep the weight of the predicted movement route (route A) generated by the route generation section 112 to keep the lamps 10 on the predicted movement route turned on, or may transfer the information on the sector address corresponding to the certain position to the route generation section 112.

Upon receiving the sector address information, the route generation section 112 may compare the received sector address with the sector addresses on the predicted movement route stored in the memory. If there exists a matched sector address, the route generation section 112 may stop control of lamps 10 by the lamp control section 150 based on the existing control information and may transfer control information on only lamps, which correspond to the sector addresses transmitted from the weighting section 113, to the lamp control section 113 which then controls only the lamps 10 corresponding to the sector addresses to be turned on, which may result in reduced power consumption.

At this time, the route generation section 112 may generate control information including not only the sector addresses transmitted from the weighting section 113 but also one or more adjacent sector addresses and provide the generated control information to the lamp control section 150 which may then turn on the lamps corresponding to the sector addresses, along with adjacent lamps corresponding to the adjacent sector addresses based on the control information.

Thereafter, when the resident begins to move again, based on movement-related motion information transmitted from the image recognition section 130, the weighting section 113 may determine that the resident moves if a displacement of the resident exceeds a preset value.

Accordingly, upon determining that the resident moves based on the motion information from the image recognition section 130, the weighting section 113 may control the route generation section 112 to stop the control of the lamps 10 by the lamp control section 150 for the existing staying condition, weight the control information read from the memory and provide the weighted control information to the route generation section 112. Thereafter, the route generation section 112 may provide the weighted control information to the lamp control section 150 which may then control the lamps for the existing predicted movement route (route A).

At this time, the route generation section 112 may generate the existing predicted movement route by receiving only the information indicating that the displacement exceeds the preset value from the weighting section 113, reading the existing control information for route A stored in the memory based on the received information and providing the read control information to the lamp control section 150.

Thereafter, if the resident finally passes through the entrance door, information indicating whether or not the resident passes through the entrance door may be generated through tracking of the image recognition section 130 and may be provided through the information collection section 111 to the route generation section 112 which may then restore the lamps 10 and the memory to their original state by resetting the lamp control section 150 and the memory. On the other hand, as shown in FIG. 5, there may occur an event where the resident moves to entrance door B along route B for a different business without moving the predicted movement route (route A) including the lamps 10 controlled by the lamp control section 150 at the parking spot or the staying position.

In this event, the image recognition section 130 may provide the motion information corresponding to route B, which is obtained through motion detection based on the image data provided by the camera section 20, to the information collection section 111 included in the controller 110, which may then transmit the motion information to the weighting section 113.

Based on the received motion information, the weighting section 113 determines that a movement direction is changed if the movement direction is different by more than a preset value from the movement direction on the predicted movement route. In addition, upon determining that a previously weighted predicted movement route is deviated by more than a preset range based on the sector address for a current resident position included in the motion information, the weighting section 113 may determine that the movement direction is changed.

Accordingly, the weighting section 113 may weight control information of route B corresponding to the changed movement direction or position and the route generation section 112 may provide corrected control information corresponding to route B to the lamp control section 150 which may then generate a movement route for the resident by controlling the lamps 10 located on route B based on the corrected control information.

That is, for both of the case where the resident stays on the movement and the case where the resident moves to a different route, it is possible to achieve reduced power consumption and improved user convenience by effectively using the image information and the motion information and control information for a predicted movement route.

In addition, if a plurality of vehicle enters the underground parking lot simultaneously, different control information with different parking spot information is generated, and a resident of a particular vehicle is deviated from a predicted movement route, the weighting section 113 may compare the parking spot information provided by the information collection section 111 with the sector address included in the control information generated by the route generation section 112, thereby discerning motion information of a vehicle with the predicted movement route changed and accordingly weighting the corrected control information corresponding to the movement direction.

Thereafter, the lamp control section 150 may compare the first sector address of the corrected control information with the first sector address included in the existing control information, stop the control for the lamps 10 included in the sector addresses of the existing control information or restore the lamps 10 to their original luminance, and control the lamps 10 based on the sector addresses included in the corrected control information.

Through the above-described processes, the controller 110 may control the lamps 10 on the corrected predicted movement route easily even when the resident is deviated from a corresponding predicted movement route while indicating different routes as a plurality of vehicles enters the underground parking lot simultaneously.

In the meantime, as described above, the route generation section 112 may receive the information indicating whether or not the resident passes through the entrance door, which is generated through tracking of the image recognition section 130, from the information collection section 111 and may then restore the lamps 10 to their original state by resetting the lamp control section 150.

In addition, the route generation section 112 may store final entrance door position information assigned with a weight in a movement route DB 161 included in the resident DB 160 of FIG. 3. At this time, the weight may be accumulated or updated in the movement route DB 161 as a frequency of use for each entrance door.

Accordingly, instead of applying the entrance door information based on the address information, the route generation section 112 may generate the predicted movement route control information for the entrance door having the highest frequency of use in the movement route DB 161 and provide the generated control information to the lamp control section 150.

In this case, the weighting section 113 may compare the control information obtained from the route generation section 112 with the motion information and provide information indicating that a movement direction of the predicted movement route or a position on the predicted movement route does not match the motion information to the route generation section 112.

Accordingly, the route generation section 112 may extract the control information having the next highest frequency of use from the movement route DB 161 and replace the extracted control information for the existing control information by providing the extracted control information to the lamp control section 150. Thus, if it is difficult to determine an entrance door through which the resident passes in a movement direction detected by the image recognition section 130, it is possible to improve reliability of prediction for movement of the resident in consideration of frequency of use for the entrance door.

In the meantime, as described above, streetlamps placed on a sidewalk located between the underground parking lot and the complex building may be also controlled in the same way as the above-described predicted movement route control in the underground parking part.

That is, the controller 110 may check through the camera section 20 and the image recognition section 130 whether or not the resident passes through the entrance door, and, if positive, restore the lamps 10 in the underground parking lot to their original state by resetting the lamp control section 150. Thereafter, the controller 110 may generate predicted movement route control information for control of the streetlamps 50 between the entrance door position information of the underground parking lot and the entrance door position information of the complex building and control the streetlamps 50 by applying the same process as the lamp control based on the generated predicted movement route control information.

Figure 6:
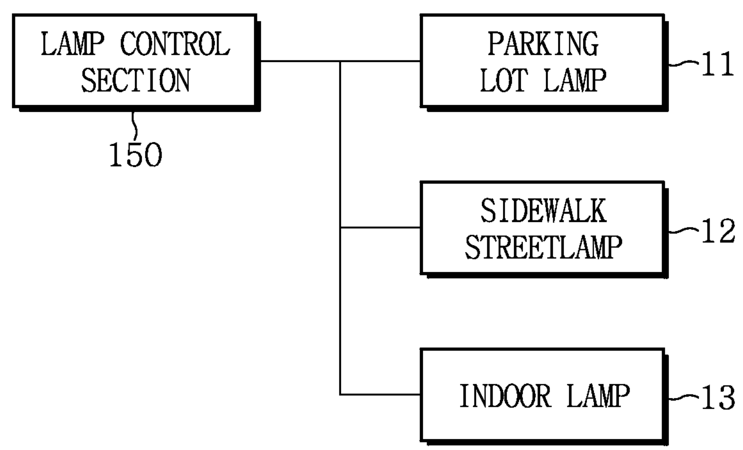
FIG. 6 is a view showing several types of lamps controlled by the automatic lighting control system according to an embodiment of the present invention.

In addition, as shown in FIG. 6, the lamp control section 150 may separately control lamps 11 of the underground parking lot, streetlamps 12 of the sidewalk, and lamps 13 located within the building, which are divided based on sector addresses included in the start and end points.

In addition, for the purpose of further reduction of power consumption of lamps included in the control information, the controller 110 may generate control information to allow some of first lamps 10 among the lamps 10 included in the control information to be first turned on and may turn on the other lamps 10 sequentially based on current resident position information received from the image recognition section 130.

In addition, based on the current resident position information, the controller 110 may generate control information to restore lamps 10, which are located at positions through which the resident passes, to their original state, and may provide the generated control information to the lamp control section 150, which may result in increased power efficiency.

Figure 7:
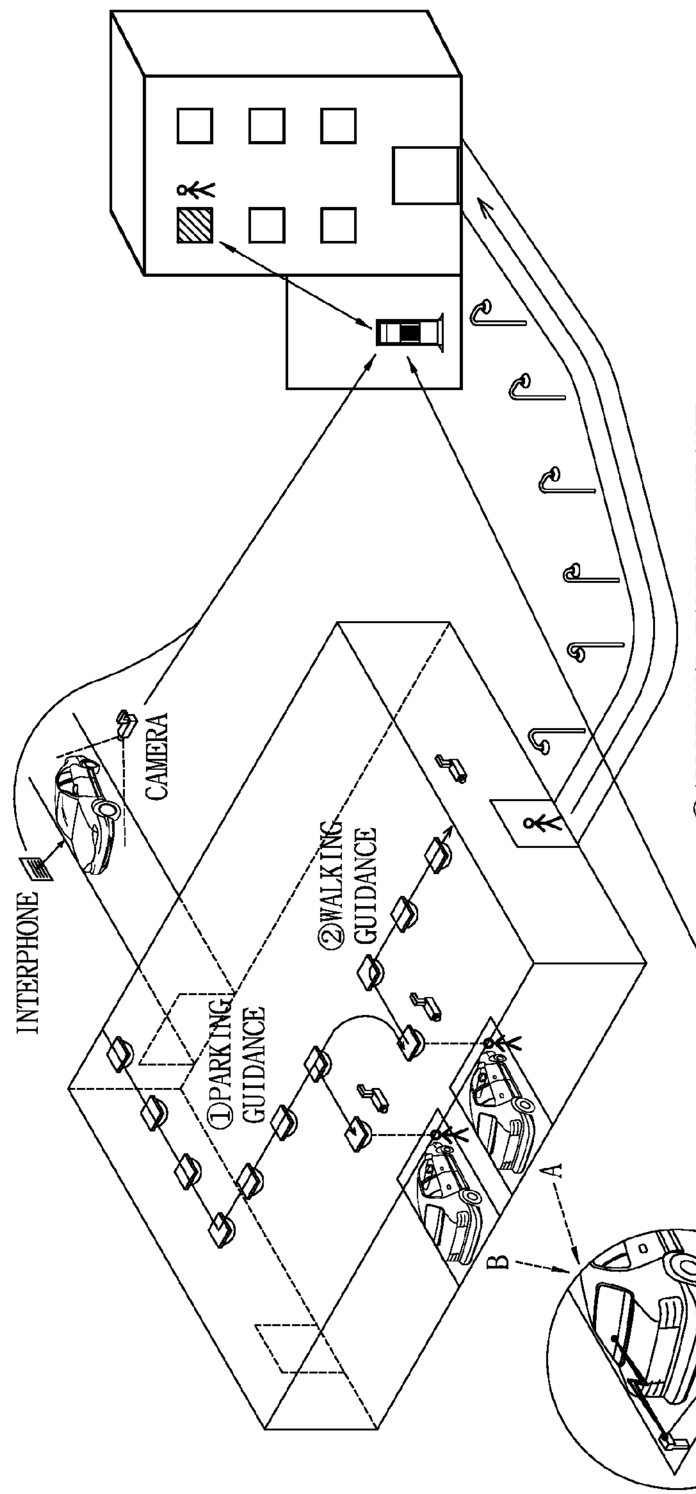
FIG. 7 is a view showing an example of generation of a predicted movement using different route-related information of the automatic lighting control system according to an embodiment of the present invention.

FIG. 7 shows different operation embodiments of the automatic lighting control system depending on movement of a vehicle or a resident.

As described above, the management server may obtain resident address information matching the license plate number or the resident ID card information obtained by the reader from a tag.

Thereafter, the management server may set an underground park lot gate as a start point based on identification information obtained from the camera section or the reader, set parking spot information adjacent to the address information as an end point based on the address information and the parking situation information, generate a predicted movement route based on the start point and the end point as described above, and control the lamps of the underground parking lot based on the control information corresponding to the predicted movement route, thereby performing a parking guide (①) for a vehicle through the lamps with controlled luminance.

In this case, based on extra parking spot information, if a vehicle has been already parked at a parking spot A nearest to the address information, the management server may set the next nearest parking spot B as an end point to provide a predicted movement route through lamp control.

Thereafter, when the resident gets out of the vehicle and moves to the residence corresponding to the address information, similarly as above, the management server may set the start point as parking spot information, set the end point as entrance position information near to the address information, generate control information for controlling lamps located on the predicted movement route, and control the lamps included in the control information, thereby performing a walking guide (②) like the parking guide.

In addition, if the complex building is separated from the underground parking lot by a certain distance, the management server may set entrance door position information of the underground parking lot as a start point, set front door position information of the complex building as an end point, and control streetlamps located between the entrance door and the front door through the control information corresponding to a predicted movement route determined based on the start point and the end point, thereby performing an additional walking guide (③) for the resident. In this case, similarly as above, the management server which received an image provided by cameras installed adjacent to the entrance door of the underground parking lot may check through motion detection of the image whether or not the resident passes through the entrance door.

In the meantime, if a visitor other than the resident visits the complex building, the management server may receive address information input by the visitor through an interphone installed at an accessway of the underground parking way in interlocking with the home automation system in the complex building and set end points for the parking guide, the walking guide and the additional walking guide, thereby providing the visitor with a predicted movement route to allow the visitor to visit a destination easily without wandering even for the first visit.

In addition, if the resident moves from the complex building to the underground parking lot, based on ID card information recognized by an interphone or a home automation system installed in the front door of the complex building, the management server may determine a parking spot of a vehicle owned by the resident, matching parking spot information provided by the parking management section, and set the start point and the end point set for the parking guide, the walking guide and the additional walking guide in a reversed manner, thereby guiding the resident to move from the residence to the underground parking lot.

While the present invention has been particularly shown and described with reference to exemplary embodiments thereof, it will be understood by those skilled in the art that various changes in form and details may be made therein without departing from the spirit and scope of the present invention. The exemplary embodiments are provided for the purpose of illustrating the invention, not in a limitative sense. Thus, it is intended that the present invention covers the modifications and variations of this invention provided they come within the scope of the appended claims and their equivalents.

What is claimed is:

1. An automatic lighting control system for predicting a movement route and showing the movement route through control of lamps, comprising:

- a camera section which is disposed on the movement route to pick up an image;
- a lamp control section which controls luminance and/or turning-on/off of each of a plurality of lamps;
- a DB section which stores resident information including address information and vehicle information, and route-related information;
- an image recognition section which recognizes vehicle parking spot information and the vehicle information based on the image provided by the camera section and checks an actual movement route of a vehicle passenger through the image; and
- a controller which determines a predicted movement route between a parking spot and a residence based on the address information extracted by matching the vehicle information provided by the image recognition section with the DB section, the parking spot information, and the route-related information, generates control information for lamps located on the predicted movement route, provides the generated control information to the lamp control section, shows the predicted movement route of the passenger through lamp control by the lamp control section, and, if the actual movement route provided by the image recognition section is different from the predicted movement route, generates control information for a different movement route according to a movement direction and replaces the generated control information for the existing control information by providing the generated control information to the lamp control section.

2. The automatic lighting control system according to claim 1, wherein the route-related information includes information on a position of an entrance door or a front door for entry to a residence corresponding to the address information.

3. The automatic lighting control system according to claim 1, wherein the camera section includes IP cameras or CCTV cameras.

4. The automatic lighting control system according to claim 1, wherein the lamp control section controls luminance of lamps located on the predicted movement route and luminance of lamps not located on the predicted movement route separately based on the control information.

5. The automatic lighting control system according to claim 1, wherein the controller determines that the actual movement route is different from the predicted movement route if a difference in movement direction between the actual movement route and the predicted movement route exceeds a preset reference value or if the actual movement route is out of a range preset on the predicted movement route.

6. The automatic lighting control system according to claim 1, wherein, if the actual movement route stays on a specific point for a preset period of time or a displacement is not changed to exceed a preset value, the controller generates control information for a lamp corresponding to the specific point or at least one lamp adjacent to the specific point and replaces the generated lamp control information for the control information for the predicted movement route, and, if it is detected that the displacement exceeds the preset value, the controller returns the lamp control information to the existing control information.

7. The automatic lighting control system according to claim 1, wherein the plurality of lamps is placed in an underground parking lot.

8. The automatic lighting control system according to claim 7, wherein the route-related information includes information for a plurality of entrance doors located in the underground parking lot, and wherein the controller weights the control information for the predicted movement route connecting the entrance door of the residence corresponding to the address information and the parking spot and provides the weighted control information to the lamp control section preferentially, wherein, if the actual movement route is different from the predicted movement route, the controller generates corrected control information by weighting a predicted movement route matching a movement direction of the actual movement route and controls the lamp control section to replace the existing control information with the corrected control information.

9. The automatic lighting control system according to claim 7, wherein the DB section stores use frequency information of the resident for each of a plurality of entrance doors installed in the underground parking lot, and wherein the controller provides control information for a predicted movement route between an entrance door having the highest use frequency and the parking spot to the lamp control section preferentially based on the parking spot information and the use frequency information, wherein, if the actual movement route is different from the predicted movement route, the controller generates corrected control information for a movement route to an entrance door having the next highest use frequency based on the use frequency information and controls the lamp control section to replace the existing control information with the corrected control information.

10. The automatic lighting control system according to claim 7, wherein the image recognition section transmits information indicating whether or not the resident passes through the entrance door of the underground parking lot based on an image transmitted by a camera located at the entrance door in the camera section, and wherein the controller controls the lamp control section to restore the lamps controlled according to the control information to an original state based on the information indicating whether or not the resident passes through the entrance door.

11. The automatic lighting control system according to claim 10, wherein a sidewalk is located between the underground parking lot and the residence corresponding to the address information, wherein the lamp control section controls streetlamps located on the sidewalk, and wherein the controller sets the front door of the residence corresponding to the address information and the entrance door as a start point and an end point, respectively, based on the information indicating whether or not the resident passes through the entrance door, and generates control information for the streetlamps based on a movement route extracted from the DB section.

12. The automatic lighting control system according to claim 1, further comprising a home automation system including an interphone, wherein the controller generates the control information based on address information obtained by matching address information input to the interphone with the DB section.

13. The automatic lighting control system according to claim 12, wherein, if the interphone is installed at a gate of the underground parking lot, the controller generates the control information by determining a parking spot adjacent to the address information based on the address information input to the interphone and determining a predicted movement route between the determined parking spot and the interphone.

14. An automatic lighting control system for predicting a movement route of a user and showing the movement route through control of lamps, comprising:

a camera section which picks up an image of the user;

a reader which recognizes a tag of the user and transmits information of the recognized tag along with identification information of the reader;

a lamp control section which controls luminance and/or turning-on/off of each of a plurality of lamps;

a DB section which stores address information and route-related information corresponding to the tag information;

an image recognition section which checks an actual movement route of the user through an image based on the image provided by the camera section; and a controller which obtains address information by matching the tag information received from the reader with the DB section, determines a predicted movement route based on a position of the reader corresponding to the identification information, the address information and the route-related information, generates control information for at least some lamps located on the predicted movement route, provides the generated control information to the lamp control section, shows the predicted movement route of the user through lamp control by the lamp control section, and, if the actual movement route provided by the image recognition section is different from the predicted movement route, generates control information for a different movement route according to a movement direction and replaces the generated control information for the existing control information by providing the generated control information to the lamp control section.

15. The automatic lighting control system according to claim 14, wherein the image recognition section generates current position information of the user at preset time intervals, and wherein the controller generates the control information based on the current position information generated by the image recognition section so that lamps located on the predicted movement route can be sequentially turned on depending on a position of the user, and provides the generated control information to the lamp control section.

16. The automatic lighting control system according to claim 14, wherein the controller generates control information to restore luminance of lamps located at positions through which the user passes to an original state based on the current position information of the user, and provides the generated control information to the lamp control section.

* * * * *